US012597241B2

(12) United States Patent (10) Patent No.: US 12,597,241 B2
Lin et al. (45) Date of Patent: Apr. 7, 2026

(54) DISTRIBUTED DATA PROCESSING SYSTEM AND DISTRIBUTED DATA PROCESSING METHOD

(71) Applicant: Acer Incorporated, New Taipei City (TW)

(72) Inventors: Kai-Hsiang Lin, New Taipei City (TW); Hung-Chun Chou, New Taipei City (TW); Tung-Chan Tsai, New Taipei City (TW); Chieh-Sheng Wang, New Taipei City (TW); Shih-Hao Lin, New Taipei City (TW); Wen-Cheng Hsu, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 285 days.

(21) Appl. No.: 18/480,520

(22) Filed: Oct. 4, 2023

(65) Prior Publication Data

US 2024/0404260 A1 Dec. 5, 2024

Related U.S. Application Data

(63) Continuation of application No. 18/325,976, filed on May 30, 2023.

(51) Int. Cl.
*G06V 10/776* (2022.01)
*G06T 7/10* (2017.01)
(Continued)

(52) U.S. Cl.
CPC .............. *G06V 10/776* (2022.01); *G06T 7/10* (2017.01); *G06T 7/50* (2017.01); *G06V 10/82* (2022.01);
(Continued)

(58) Field of Classification Search
CPC ...... G06V 10/776; G06V 10/82; G06V 20/70; G06V 10/764; G06V 10/774; G06T 7/10;
(Continued)

(56) References Cited

U.S. PATENT DOCUMENTS 10,440,088 B2 * 10/2019 Jayachandran ....... H04L 65/613
10,911,468 B2 2/2021 Muddu et al.
(Continued)

FOREIGN PATENT DOCUMENTS

CN 114787833 7/2022
CN 114998716 9/2022
(Continued)

OTHER PUBLICATIONS

Daniel Kang et al., "NoScope: Optimizing Neural Network Queries over Video at Scale", Proceedings of the VLDB Endowment, Aug. 1, 2017, pp. 1-12, vol. 10, Issue 11.
(Continued)

*Primary Examiner* — Xuemei G Chen
(74) *Attorney, Agent, or Firm* — JCIPRNET

(57) ABSTRACT

A distributed data processing system and a distributed data processing method are provided. The distributed data processing system includes a computing device and at least one additional computing device. In the method, the computing device receives a dataset to be processed, selects at least one computing device capable of executing a first machine learning model on the dataset from the computing device and the additional computing device to process the dataset and generate a first prediction result, selects at least one computing device capable of executing each of multiple machine learning models on the dataset from the computing device and the additional computing device to process the dataset and generate at least a second prediction result and a third prediction result, selects a second machine learning
(Continued)

model from the multiple machine learning models based on a comparison between the first prediction result and at least the second prediction result and the third prediction result, and instructs the at least one computing device for executing the second machine learning model to process the dataset.

20 Claims, 6 Drawing Sheets

(51) Int. Cl.
*G06T 7/50* (2017.01)
*G06V 10/82* (2022.01)
*G06V 20/70* (2022.01)

(52) U.S. Cl.
CPC .... *G06V 20/70* (2022.01); *G06T 2207/20021* (2013.01); *G06T 2207/20081* (2013.01); *G06T 2207/20084* (2013.01)

(58) Field of Classification Search
CPC ............. G06T 7/50; G06T 2207/20021; G06T 2207/20081; G06T 2207/20084; G06T 19/00; G06N 20/00; G06N 3/045; G06F 9/5083
See application file for complete search history.

(56) References Cited

U.S. PATENT DOCUMENTS

| | | | | |
|---|---|---|---|---|
| 11,308,365 | B2 * | 4/2022 | Wen | G06F 16/51 |
| 11,816,801 | B1 * | 11/2023 | Bhushan | H04L 63/0428 |
| 12,254,566 | B2 * | 3/2025 | Ramirez Solorzano | H04N 21/23412 |
| 2010/0008415 | A1 * | 1/2010 | Kajita | H04N 19/51 |
| | | | | 375/240.01 |
| 2015/0145889 | A1 * | 5/2015 | Hanai | G06T 3/60 |
| | | | | 345/633 |
| 2018/0300610 | A1 * | 10/2018 | Pye | G06N 3/045 |
| 2019/0102435 | A1 * | 4/2019 | Bishnoi | G06F 16/24568 |
| 2019/0273902 | A1 * | 9/2019 | Varekamp | H04N 13/189 |
| 2020/0117700 | A1 * | 4/2020 | Chatterjee | G06N 3/04 |
| 2020/0143254 | A1 * | 5/2020 | Dey | G06N 3/10 |
| 2020/0387364 | A1 * | 12/2020 | O'Connell | G06F 8/51 |
| 2021/0166117 | A1 | 6/2021 | Chu et al. | |
| 2021/0279595 | A1 * | 9/2021 | Sridhar | G06N 3/098 |
| 2022/0101098 | A1 * | 3/2022 | Li | G06N 3/042 |
| 2022/0230421 | A1 * | 7/2022 | Yang | H04L 67/01 |
| 2022/0245512 | A1 * | 8/2022 | Talanine | G06Q 10/1053 |
| 2022/0335303 | A1 * | 10/2022 | Haidar | G06N 3/094 |
| 2022/0366526 | A1 | 11/2022 | Das et al. | |
| 2023/0075836 | A1 * | 3/2023 | Tang | G06V 10/30 |
| 2023/0110925 | A1 * | 4/2023 | Akbari | G06V 10/82 |
| | | | | 706/46 |
| 2023/0134865 | A1 * | 5/2023 | Yeh | A61M 1/1613 |
| | | | | 702/19 |
| 2023/0198855 | A1 | 6/2023 | Ganesan et al. | |
| 2023/0215140 | A1 * | 7/2023 | Sikka | G06V 10/72 |
| | | | | 382/157 |
| 2023/0222817 | A1 * | 7/2023 | Sun | G06N 3/08 |
| | | | | 382/103 |
| 2023/0232080 | A1 * | 7/2023 | Kim | G06F 1/3212 |
| | | | | 382/155 |
| 2023/0244910 | A1 * | 8/2023 | Kim | G06N 3/045 |
| | | | | 706/14 |
| 2023/0252294 | A1 * | 8/2023 | Gu | G06N 3/0495 |
| | | | | 706/25 |
| 2023/0252769 | A1 * | 8/2023 | Bhat | G06V 10/761 |
| | | | | 382/157 |
| 2023/0324553 | A1 * | 10/2023 | Timmer | G06V 20/35 |
| | | | | 356/4.01 |
| 2023/0409876 | A1 * | 12/2023 | Agrawal | G06N 3/045 |
| 2024/0073452 | A1 * | 2/2024 | Li | H04N 19/124 |
| 2024/0086709 | A1 * | 3/2024 | Donderici | G06N 3/048 |
| 2024/0112445 | A1 * | 4/2024 | Im | G06N 3/045 |
| 2024/0249182 | A1 * | 7/2024 | Kirshenboim | G06N 3/0985 |
| 2024/0296335 | A1 * | 9/2024 | Jandial | G06N 3/096 |
| 2024/0296338 | A1 * | 9/2024 | Yeom | G06N 3/045 |
| 2024/0346326 | A1 * | 10/2024 | Tyou | G06N 3/045 |
| 2024/0394509 | A1 * | 11/2024 | Cheon | G01B 11/14 |
| 2024/0412075 | A1 * | 12/2024 | Zhao | G06N 3/082 |
| 2025/0165782 | A1 * | 5/2025 | Sun | G06N 3/04 |
| 2025/0259068 | A1 * | 8/2025 | Zisserman | G06N 3/045 |

FOREIGN PATENT DOCUMENTS

| | | |
|---|---|---|
| CN | 115699204 | 2/2023 |
| TW | 202145084 | 12/2021 |
| TW | 202247650 | 12/2022 |

OTHER PUBLICATIONS

Carlos Riquelme et al., "Scaling Vision with Sparse Mixture of Experts", arxiv.org, Cornell University Library, 201 Olin Library Cornell University Ithaca, NY 14853, Jun. 10, 2021, pp. 1-43, XP081987921.

Yinhui Ren et al, "3D Reconstruction From Monocular Images Based on Deep Convolutional Networks", 2020 13th International Congress on Image and Signal Processing, BioMedical Engineering and Informatics (CISP-BMEI), Oct. 2020, pp. 248-252.

* cited by examiner

FIG. 3

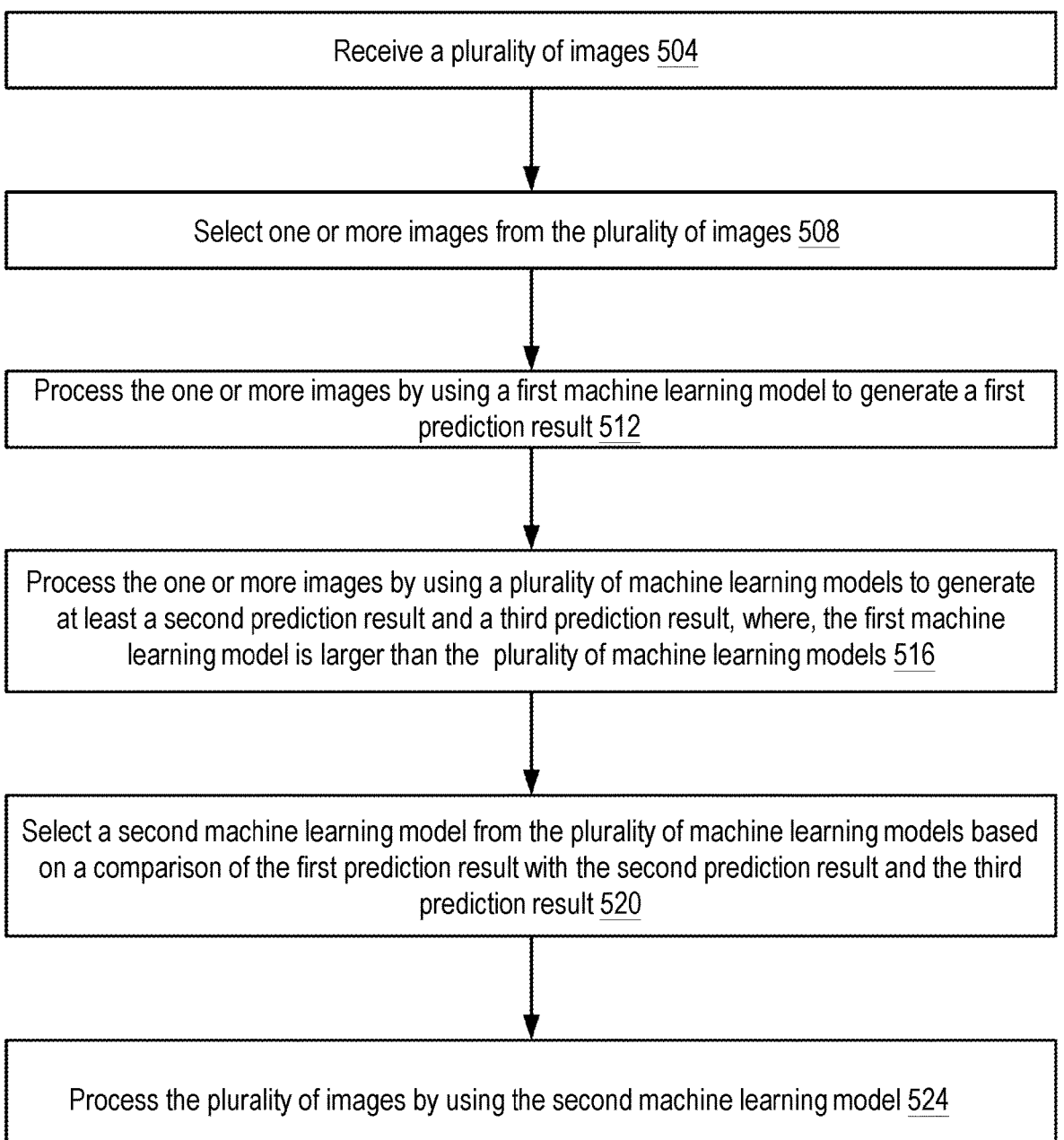

Receive a plurality of images 504

Select one or more images from the plurality of images 508

Process the one or more images by using a first machine learning model to generate a first prediction result 512

Process the one or more images by using a plurality of machine learning models to generate at least a second prediction result and a third prediction result, where, the first machine learning model is larger than the plurality of machine learning models 516

Select a second machine learning model from the plurality of machine learning models based on a comparison of the first prediction result with the second prediction result and the third prediction result 520

Process the plurality of images by using the second machine learning model 524

FIG. 5

DISTRIBUTED DATA PROCESSING SYSTEM AND DISTRIBUTED DATA PROCESSING METHOD

CROSS-REFERENCE TO RELATED APPLICATION

This is a continuation application of and claims the priority benefit of U.S. application Ser. No. 18/325,976, filed on May 30, 2023. The entirety of the above-mentioned patent application is hereby incorporated by reference herein and made a part of this specification.

BACKGROUND

Technical Field

The disclosure relates to a data processing system and a data processing method, and particularly relates to a distributed data processing system and a distributed data processing method.

Description of Related Art

Learning ability of a deep neural network may be positively correlated with a number of parameters and relative accuracy of the parameters. Thus, a large deep neural network (for example, the deep neural network with a parameter number greater than a threshold number) may achieve high accuracy for general or non-specific input datasets. However, the large deep neural network may come with many drawbacks. For example, the large deep neural network may consume a lot of memory, consume a lot of processing resources, take time to process datasets (which may be a problem for real-time operations), use a large amount of training datasets to train the large deep neural network to necessary accuracy, take a long period of time to perform training, etc. Therefore, although the large deep neural network may be trained to acceptable accuracy for some datasets, the large deep neural network may not be suitable in many cases.

SUMMARY

The disclosure provides a distributed data processing system including a computing device and at least one additional computing device. The computing device and the additional computing device respectively execute a first machine learning model and at least one of a plurality of machine learning models, where the first machine learning model is larger than the plurality of machine learning models. The computing device includes a data processor configured to process a received dataset. The data processor includes a load balancer and a mode selector. The load balancer is configured to select at least one computing device capable of executing the first machine learning model on the received dataset from the computing device and the additional computing device to process the dataset and generate a first prediction result, and selects at least one computing device capable of executing each of the plurality of machine learning models on the received dataset from the computing device and the additional computing device to process the dataset and generate at least a second prediction result and a third prediction result. The mode selector is configured to select a second machine learning model from the plurality of machine learning models based on a comparison of the first prediction result and the at least second prediction result and the third prediction result. Where, the data processor is configured to instruct the at least one computing device for executing the second machine learning model to process the dataset.

In some embodiments, the load balancer includes using the dataset and one or a plurality of features of the computing device and the additional computing device to select the computing device for processing the received dataset.

In some embodiments, the one or plurality of features include a data type and an expected output of the dataset, a processing load of each of the computing devices in the computing device and the additional computing device, a processible data type, a network bandwidth, a transmission path, accuracy or loss of the machine learning model configured to process the dataset, or a combination of the above features.

In some embodiments, the load balancer further weights the one or plurality of features to select the at least one computing device for processing the received dataset, and continuously adjusts the weight of each of the one or plurality of features based on a state of the distributed data processing system.

In some embodiments, the load balancer further divides the dataset into a plurality of segments discrete to each other to generate a sequence of a plurality of feature vectors, and transmits each of the feature vectors and an associated sequence identifier thereof to the selected computing device for processing the feature vector and producing an output, where the sequence identifier of each of the feature vectors indicates a part of the dataset from which the feature vector originates.

In some embodiments, the load balancer further receives the output and the sequence identifier from the selected computing device, and assembles the output into an output sequence according to the sequence identifier.

In some embodiments, the segment includes every image or video frame, every n-second block, or every n-bit data, where n is a positive integer.

In some embodiments, the mode selector includes generating a first accuracy value of the first prediction result, a second accuracy value of the second prediction result, and a third accuracy value of the third prediction result, and comparing the first accuracy value, the second accuracy value and the third accuracy value, where the second machine learning model is selected based on the second accuracy value being higher than the first accuracy value and the third accuracy value.

In some embodiments, the mode selector includes generating a first value of the first prediction result, a second value of the second prediction result, and a third value of the third prediction result using a loss function, and comparing the first value, the second value, and the third value, where the second machine learning model is selected based on the second value being higher than the first value and the third value.

In some embodiments, the first machine learning model includes more layers than each of the plurality of machine learning models.

The disclosure provides a distributed data processing method adapted to a distributed data processing system including a computing device and at least one additional computing device. The method includes following steps: receiving a dataset to be processed by the computing device; selecting at least one computing device capable of executing a first machine learning model on the received dataset from the computing device and the additional computing device by the computing device to process the dataset and generate a first prediction result; selecting at least one computing device capable of executing each of a plurality of machine learning models on the received dataset from the computing device and the additional computing device by the computing device to process the dataset and generate at least a second prediction result and a third prediction result; selecting a second machine learning model from the plurality of machine learning models by the computing device based on a comparison between the first prediction result and the at least second prediction result and the third prediction result; and instructing the at least one computing device for executing the second machine learning model by the computing device to process the dataset.

In some embodiments, the computing device includes using the dataset and one or a plurality of features of the computing device and the additional computing device to select the computing device for processing the received dataset.

In some embodiments, the one or plurality of features include a data type and an expected output of the dataset, a processing load of each of the computing devices in the computing device and the additional computing device, a processible data type, a network bandwidth, a transmission path, accuracy or loss of the machine learning model configured to process the dataset, or a combination of the above features.

In some embodiments, the computing device further weights one or a plurality of features to select the at least one computing device for processing the received dataset, and continuously adjusts the weight of each feature based on a state of the distributed data processing system.

In some embodiments, the computing device further divides the dataset into a plurality of segments discrete to each other to generate a sequence of a plurality feature vectors, and transmits each of the feature vectors and an associated sequence identifier thereof to the selected computing device for processing the feature vector and producing an output, wherein the sequence identifier of each of the feature vectors indicates a part of the dataset from which the feature vector originates.

In some embodiments, the computing device further receives the output and the sequence identifier from the selected computing device, and assembles the output into an output sequence according to the sequence identifier.

In some embodiments, the segment includes every image or video frame, every n-second block, or every n-bit data, where n is a positive integer.

In some embodiments, the computing device includes generating a first accuracy value of the first prediction result, a second accuracy value of the second prediction result, and a third accuracy value of the third prediction result, and comparing the first accuracy value, the second accuracy value and the third accuracy value, where the second machine learning model is selected based on the second accuracy value being higher than the first accuracy value and the third accuracy value.

In some embodiments, the computing device includes generating a first value of the first prediction result, a second value of the second prediction result, and a third value of the third prediction result using a loss function, and comparing the first value, the second value, and the third value, where the second machine learning model is selected based on the second value being higher than the first value and the third value.

In some embodiments, the first machine learning model includes more layers than each of the plurality of machine learning models.

These illustrative examples are mentioned not to limit or define the disclosure, but to facilitate the understanding of the disclosure. Additional embodiments are discussed in the detailed description, and further explanations are provided in the detailed description.

BRIEF DESCRIPTION OF THE DRAWINGS

FIG. 3 is a block diagram of an exemplary distributed data processing network according to various aspects of the disclosure.

FIG. 5 is a flowchart of an exemplary process for model selection of monocular depth estimation according to various aspects of the disclosure.

DESCRIPTION OF THE EMBODIMENTS

Figure 1:
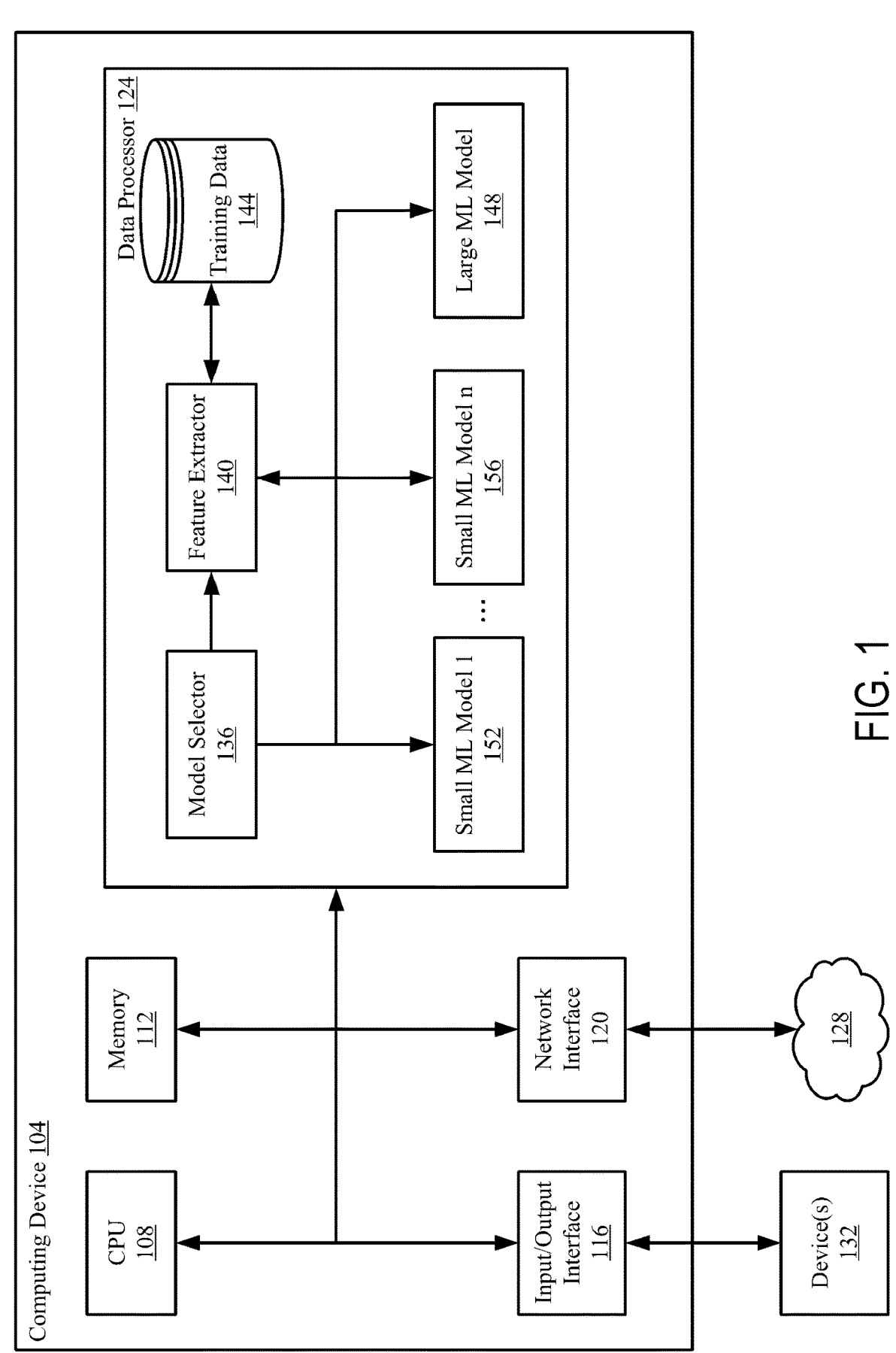
FIG. 1 is a block diagram of an exemplary system for selecting a machine learning model configured to process disparate datasets according to various aspects of the disclosure.

Learning ability of a machine learning model may be related to a number of parameters or a number of layers of the model. Enhanced learning capability (for example, by increasing the number of parameters or the number of layers) enable machine learning models to learn from a wider dataset. For example, by increasing the number of parameters of a classifier, the number of classifications that the classifier may reliably distinguish is increased. By increasing the number of parameters or layers of a machine learning model, processing cost of executing the model (for example, processing load, execution time, training time, etc.) may be increased, which may make the machine learning model inoperable under certain conditions (for example, real-time operation, etc.).

This specification describes a method and a system selected for machine learning models for discrete processing tasks. Multiple small machine learning models may be instantiated and trained to process an input dataset instead of large machine learning models. Since each small machine learning model may include fewer parameters or layers than a large machine learning model, the small machine learning model may be configured to achieve a same degree of accuracy as the large machine learning model for a portion of the given input dataset. Each small machine learning model may be configured to process a specific input dataset (for example, a dataset including specific features, etc.), or may be configured to produce a specific output (for example, a subset of a possible output produced when a large machine learning model is configured, etc.). The plurality of small machine learning models may be configured together to process the same input dataset that the large machine learning model is configured to process with similar accuracy and/or loss as the large machine learning model. However, the small machine learning models with fewer parameters or layers than the large machine learning models may operate more efficiently (for example, use fewer processing resources to store and/or execute, use smaller training datasets for training, faster training time, etc.).

For example, a large classifier may be configured to classify an input image according to a number of different categories based on objects within the input image. A first small machine learning model may be instantiated to classify the input image according to a subset of the different categories, and a second machine learning model may be instantiated to classify the input image according to the remaining different categories. Alternatively or additionally, the first machine learning model may be instantiated to classify an input image characterized by natural lighting (for example, sunlight, etc.), and the second machine learning model may be instantiated to classify the input image characterized by synthetic lighting (for example, flash light, incandescent light, fluorescent light, etc.).

In some examples, the large machine learning model may be compressed into a small machine learning model. By compressing a machine learning model, the number of parameters or layers may be reduced, which makes the compressed machine learning model suitable for processing a portion of the input dataset that a large machine learning model may process. Once compressed, the compressed machine learning model may be trained by using different training dataset, so as to instantiate the multiple small machine learning models. Each small machine learning model may be trained to process a series of input datasets that the corresponding large machine learning model is expected to process.

Once performing training, a large machine learning model and multiple small machine learning models may be used to process the input dataset. For any input dataset, a model selector may determine which machine learning model (among the large machine learning model and the multiple small machine learning models) should be used to process the specific input dataset. In some examples, the model selector may sample the input dataset to generate test feature vectors, and passes the test feature vectors as input to the machine learning model to produce a corresponding test output. For a deep neural network (DNN), one or a plurality of initial layers of the DNN may operate as a feature extractor. The test output from the large machine learning model may be labeled as a pseudo ground truth (for example, true). The model selector may then compare the test output from each small machine learning model to the test output from the large machine learning model. In some embodiments, the model selector may use an accuracy metric or a loss function (such as accuracy, precision, area under the curve, logarithmic loss, F1 score, weighted human disagreement rate, cross entropy, mean absolute error, mean square error, etc.). The model selector may identify a specific small machine learning model having the highest accuracy metric or lowest loss (according to the loss function) among the plurality of small machine learning models. The model selector may then use with the specific small machine learning model to process the rest part of the specific input dataset.

In an illustrative example, monocular depth estimation may be performed by one or a plurality of machine learning models (such as DNN or similar models), the one or plurality of machine learning models are used for various computer vision operations (such as, but not limited to, classification, semantic segmentation, object detection, instance segmentation, depth estimation, etc.) (such as, for example, autonomous driving for driverless vehicles, virtual reality, augmented reality, three-dimensional (3D) analogy, target acquisition, etc.). A computing device may instantiate (define and train) a large DNN to process various images, video frames, or video clips to generate depth maps or inverse depth maps by using monocular depth estimation. The depth map may represent each pixel of an image as a distance (for example, a real number) between a location of the pixel in an environment and a camera. Multiple small DNNs may also be trained to process various input images, video frames and/or video clips. In some examples, the large DNN may be compressed and the compressed large DNN may be trained to generate each small DNN.

A computing device may receive a plurality of images. The plurality of images may be different images, images extracted from video frames, images extracted from video clips, or similar images. The images may be received from a content delivery network, a user device, another computing device, a camera (for example, such as a live camera stream or previously stored images captured by the camera), a server, etc. Alternatively, the computing device may receive images by retrieving the images from video clips stored in a memory of the computing device.

The computing device may select one or a plurality of images from a plurality of images. In some examples, the computing device samples the plurality of images to export the one or plurality of images.

The computing device may process the one or plurality of images by using the large DNN to generate a first prediction result corresponding to an output of the large DNN. For example, a computing device may use the one or plurality of images to generate a feature vector, and transmits the feature vector as an input to the large DNN. The large DNN may process the feature vector and output the first prediction result (for example, a depth map or a reverse depth map, etc.). In some examples, the computing device may take the first prediction result as a pseudo ground truth.

The computing device may use the plurality of small DNNs to process the one or plurality of images to generate an additional prediction result. For example, a first small DNN may process one or a plurality of images to generate a second prediction, a second small DNN may process one or a plurality of images to generate a third prediction, and so on. Each one of the small DNNs may be smaller than the large DNN (for example, fewer parameters and/or layers, etc.).

The computing device may select a small DNN from the plurality of small DNNs based on a comparison of the first prediction result with the second prediction result and the third prediction result. In some examples, the computing device may compare the second prediction result, the third prediction result, etc., with the first prediction result using one or a plurality of accuracy metrics and/or loss functions. For example, since a prediction result include a depth map or an inverse depth map (for example, representing each pixel as a real distance from the camera), a loss function may be used to determine a difference between the first prediction result (which is marked as the pseudo ground truth) and the second prediction result, and between the first prediction result and the third prediction result, etc. Examples of the loss function include, but are not limited to, adaptive robust loss, mean squared error, mean absolute error, cross entropy, weighted human disagreement rate (WHDR), combinations thereof, or similar functions. The computing device may select a specific small DNN with the highest accuracy metric, lowest error, lowest loss, etc.

The computing device may then process the plurality of images by using the specific small DNN to generate a depth map or an inverse depth map from the plurality of images.

In some examples, the computing device may process each of the plurality of images. In other examples, the computing device may process a portion of the plurality of images by sampling the plurality of images. For example, the computing device processes every $n^{th}$ image of the plurality of images.

In some examples, the model selection process may be repeated to ensure that the specific small DNN remains the most efficient small DNN for processing the plurality of images. When an event is detected, when a user input is detected, after a predetermined number of instances of the specific small DNN are executed, when changes in one or a plurality of features of the plurality of images are detected (such as a change in an average pixel value, etc.), in a combination of the above situations, or in similar situations, the model selection process may be re-executed at regular time intervals. The computing device may continuously ensure that the multiple images are processed by using the most efficient small DNN.

The model selection process may be applied to various machine learning models to determine efficient ways of processing disparate datasets. In this way, the techniques explained in this specification may be applied to deep neural networks (as explained above) as well as any other type of machine learning models.

FIG. 1 is a block diagram of an exemplary system for selecting a machine learning model configured to process disparate datasets according to various aspects of the disclosure. A computing device 104 may be configured to process disparate datasets for neighboring devices (for example, devices operating within a same network) and/or remote devices (for example, devices operating within other networks, etc.). The computing device 104 may include a central processing unit (CPU) 108, a memory 112 (for example, a volatile memory (for example, a random access memory, etc.) and a non-volatile memory (such as a flash memory, a hard disk, etc.)), an input/output interface 116, a network interface 120 and a data processor 124 connected by a bus or similar device. In some implementations, the computing device 104 may include additional elements or fewer elements.

The input/output interface 116 may include one or a plurality of hardware and/or software interfaces, and the one or plurality of hardware and/or software interfaces are configured to receive data from and/or transmit data to one or a plurality of devices 132. The one or plurality of devices 132 are connected to the computing device 104, and are, for example, but not limited to, display devices, keyboards and mouses, sensors, peripheral devices, media streaming devices, augmented reality devices, virtual reality devices, and/or similar devices. In an illustrative example, a first device of the one or plurality of devices 132 may be a virtual reality display device, where the virtual reality display device is configured to project a three-dimensional representation of media (for example, a video, a video game, one or a plurality of images, etc.). If the media does not include three-dimensional data (for example, the media is two-dimensional, etc.), the computing device 104 may perform monocular depth estimation by using data processor 124 to generate a depth map and generate the three-dimensional representation of the media from the depth map. The computing device 104 may then transmit the three-dimensional representation of the media to the virtual reality display through the input/output interface 116. The one or plurality of devices 132 may be connected via a wired connection (for example, universal serial bus (USB) type A, USB type B, or USB type C; high-definition multimedia interface (HDMI);

digital visual interface (DVI); displayport; etc.) or wireless connection (for example, but not limited to wireless fidelity (Wi-Fi), Bluetooth, Zigbee, Z-wave, infrared, ultra-wideband, etc.).

The network interface 120 may realize connection to one or a plurality of remote devices through a network 128 (for example, the Internet, a local area network, a wide area network, a cloud network, etc.). In some examples, the computing device 104 may receive a request to process data by using the data processor 124 through the network interface 120. Once the request is received, the computing device 104 may store the data in the memory 112, process the data by using the data processor 124, and transmit an output to the request device (or one or more other devices) through the network 128. Alternatively or additionally, the output may be presented via the one or plurality of devices 132. In some examples, the data processor 124 may process the received data in real-time. In these examples, the data processor 124 may process streamed data when receiving the streamed data (the streamed data is through the network interface 120 or the input/output interface 116), or may store a portion of the stream in a buffer of the memory 112 and process a portion of the streamed data stored in the buffer whenever the buffer is full.

In some implementations, data processor 124 may be an independent component of the computing device 104 that is connected to the CPU 108, the memory 112, the input/output interface 116, and the network interface 120 via the bus. The data processor 124 may be configured to operate within the computing device 104 or may operate independently from the computing device 104. For example, the data processor 124 may be an application specific integrated circuit (ASIC), a field programmable logic gate array, a mask programmable gate array, a microcontroller or similar device configured to process instructions stored in the memory of the data processor 124. Alternatively, the data processor 124 may be a non-volatile memory (either as an independent component connected to the bus or as a subcomponent of the memory 112) configured to process various datasets, where the non-volatile memory stores instructions. The instructions may be executed by the CPU 108 (and/or other components of the computing device 104).

The data processor 124 may include a model selector 136 configured to select a specific machine learning model for processing a specific dataset; a feature extractor 140 configured to generate an input feature vector of the selected machine learning model (for example, a model that does not require additional feature extractor); training data 144 configured to store training data of the machine learning model; a large machine learning (ML) model 148; and one or a plurality of small machine learning models (for example, such as a small ML model 1 152 to a small ML model n 156, where n may be any integer greater than 1).

The data processor 124 may use two or more machine learning models to process various types of datasets. The two or more machine learning models may be of different sizes, where the different sizes allow the data processor 124 to dynamically select the most efficient machine learning model used for processing a given dataset based on a current state of the data processor 124 and/or the computing device 104, or dynamically switch to a different machine learning model. The two or more machine learning models may include a large machine learning model (for example, a machine learning model with a number of parameters or layers greater than a threshold) and one or a plurality of small machine learning models (for example, a machine learning model with a number of parameters or layers smaller than the threshold).

A size of a machine learning model (for example, a number of parameters, a number of layers, etc., of a neural network) may indicate a learning potential of the machine learning model. The large machine learning model may be trained to process general datasets (for example, datasets that may not correspond to any taxonomy or may not have any specific common feature). For example, a large image classifier trained to classify objects within an image may classify randomly sampled input images (for example, daylight, indoor, nighttime or low-light, object to be classified is shielded or far from the camera, object to be classified is clear and close to the camera, etc.). When classifying certain types of images, the small machine learning models may have lower accuracy and/or higher loss. For example, a small image classifier trained to classify objects within an image may classify images that have a common specific feature (for example, such as images taken during the day or under a large amount of light) and may have lower accuracy or higher loss when classifying images with different features (for example, images captured at night or in low-light conditions, etc.).

The large machine learning model may have a larger memory occupation area and may use more processing resources (for example, CPU 108, cache or volatile memory, non-volatile memory, bandwidth, etc.) than the corresponding small machine learning models. The large machine learning model may also have a training interval different to the small machine learning model and execute within a longer time interval, making the use of the large machine learning model more complex for time-sensitive operations.

The machine learning models 148-156 may be any type of machine learning models, including but not limited to neural networks, deep neural networks, transformers, classifiers, support vector machines, decision trees, etc. In some examples, the machine learning models 152-156 may be generated by compressing the large machine learning model 148 (before, during, or after the large machine learning model 148 is trained). In these examples, the large machine learning model 148 is compressed through pruning (for example, removing unnecessary parameters or layers, etc.), quantization (for example, reducing a memory occupation area of the parameters, etc.), knowledge distillation (for example, training the small machine learning models to simulate the large machine learning model), low-rank factorization, etc.

The large machine learning model 148 may be trained and/or compressed through the data processor 124. The one or plurality of small machine learning models 152-156 may be generated by compressing the large machine learning model 148 and/or trained by the data processor 124. The model selector 136 may determine, for the selected processing task, the type of the machine learning model to perform a processing task. The model selector 136 may transmit a training request to the feature extractor 140. The feature extractor 140 may generate a training dataset to train the machine learning model to execute the processing task. The data processor 124 may use training data stored in the training data 144, generated (for example, programmatically generated by the feature extractor 140 or received from user input), or obtained from one or more remote devices (for example, one or more devices 132, one or more remote devices connected via the network 128, etc.) to train the machine learning model to perform one or more operations. The training data 144 may store data, and the data is configured to train the machine learning model to process a specific type of input data. For example, the training data 144 may store image data so that the machine learning model may be trained to process images (for example, to generate depth maps, classify images, detect objects, etc.). The training data 144 may also store historical data (for example, data associated with historical executions of the machine learning models 148-156, etc.), generated data, received data, etc. If the one or plurality of small machine learning models 152-156 are to be trained independently from the large machine learning model 148, the feature extractor 140 may generate a training dataset for the one or plurality of small machine learning models 152-156 based on the type of the machine learning model and a size of the machine learning model to be trained. The training dataset used to train the one or plurality of small machine learning models 152-156 may be similar or the same as a training dataset used to train the large machine learning model 148.

The feature extractor 140 may use the training dataset to train the machine learning models 148-156. The machine learning models 148-156 may be trained for a predetermined number of iterations within a predetermined time interval until reaching a target accuracy metric, reaching a target loss value (based on one or more loss functions), etc.

The data processor 124 may receive a dataset, and use one or a plurality of the trained machine learning models 148-156 to implement processing. The dataset may be received through the input/output interface 116, the network interface 120, or may be stored in the memory 112. The dataset may be a discrete dataset (for example, with a clear size and/or length, etc.) or may be a continuous streaming (such as a broadcast media, a video game or other media with uncertain size or length). The model selection device 136 may determine which one of the machine learning model 148-156 will most efficiently process the received dataset (or a part of the received dataset) through the following methods: sampling the dataset, using the machine learning model to process the samples, and comparing the results to determine which machine learning model should be used to process the dataset.

The model selector 136 may sample the dataset by extracting a part of the dataset. The model selector 136 may sample an initial part of the dataset (such as a first number of bits, a first number of images or video frames, a first predetermined second of audio, etc.). Alternatively or additionally, the model selector 136 may, for example, use a random number generator to randomly select a part of the dataset to obtain random samples of the dataset. The model selector 136 may send a sample identification and an instruction indicating which machine learning models will be used to the feature extractor 140.

The feature extractor 140 may generate a feature vector for the selected machine learning models (for example, the large machine learning model 148 and one or more machine learning models 152-156 that do not include an internal feature extraction function, etc.). The large machine learning model 148 may use the feature vector coming from the feature extractor 140 for execution and produce a first output (for example, a first prediction result). The small machine learning model 1 152 to the small machine learning model n 156 may also use the same feature vector (or a feature vector customized by the feature extractor 140 for the corresponding small machine learning models) for execution, and produce a second output (for example, a prediction result from the small machine learning model 1 152) to an $n^{th}$ output (from the small machine learning model n 156, etc.).

The model selector 136 may compare the first output with the second to n$^{th}$ outputs to determine which of the small machine learning models should be used to process the dataset. For example, the model selector 136 may mark the first output as a ground truth, and then use the first output to measure the accuracy and/or loss of the second output to the n$^{th}$ output to determine the accuracy (for example, using an accuracy metric, etc.) and/or loss (for example, using a loss function, etc.) of each of the small machine learning models 152-156 relative to the large machine learning model 148 for the specific dataset. The model selector 136 may select the small machine learning models 152-156 with the highest accuracy and/or lowest loss. Alternatively, the model selector 136 may measure the second to n$^{th}$ outputs relative to the first output and/or relative to the second to n$^{th}$ outputs to produce a distribution of relative outputs (for example, the second output relative to the third output, the second output relative to the fourth output, the second output relative to the n$^{th}$ output, etc.), and may select a specific output as a preferred output over the other outputs based on the relative outputs. Then, the small machine learning models corresponding to the specific output may then be selected to process the dataset. Alternatively, the model selector 136 may measure each of the second to n$^{th}$ outputs independently from the other outputs to determine the small machine learning models used to process the dataset. In the embodiment, the large machine learning model 148 may not be used (for example, the first output may not be generated). The model selector 136 may measure the output relative to other outputs using any accuracy metric and/or loss function.

Alternatively, the model selector 136 may determine to use the large machine learning model 148 rather than the small machine learning models 152-156 to process the dataset. The model selector 136 may determine that the small machine learning models 152-156 may have accuracy metrics less than a first threshold and/or loss functions greater than a second threshold. Therefore, the model selector 136 may select the large machine learning model 148 as the most efficient machine learning model for processing the dataset. The model selector 136 may select the machine learning model by balancing processing efficiency (for example, the small machine learning models 152-156 may be probably more efficient by using fewer processing resources) and balancing accuracy (the large machine learning model 148 may sometimes be more accurate than the small machine learning models 152-156).

The model selector 136 may select a small machine learning model as long as the accuracy of the selected small machine learning model relative to the large machine learning model 148 complies with following conditions: 1) greater than other small machine learning models being considered; and 2) greater than the first threshold. Examples of accuracy metrics and/or loss functions include, but are not limited to, accuracy, precision, area under the curve, logarithmic loss, F1 score, weighted human disagreement rate, cross entropy, mean absolute error, mean square error, or similar functions. The model selector 136 may start processing the remaining part of the dataset by using the small machine learning model with the highest accuracy and/or lowest loss.

In some instances, the model selector may again perform the selection process of the machine learning model during a processing period of the dataset to ensure that the selected small machine learning model remains the most efficient machine learning model for processing the dataset. For example, the data processor 124 may process a video stream to generate an estimated depth map for each video frame (or every n$^{th}$ frame, etc.). The front several video frames of the video stream may correspondingly include a high-light condition for which the small machine learning model 1 152 is shown to be the most efficient (based on execution of the aforementioned model selection process). Subsequent portions of the video stream may include video frames including a low-light condition for which the small machine learning model 1 152 may not be the most efficient (for example, when processing the low-light video frames, the small machine learning model 1 152 may have lower accuracy and/or higher loss). The model selector 136 may use one or a plurality of latest inputs to the small machine learning model 1 152 to re-execute the model selection process and select one of the large machine learning model 148 and/or a small machine learning model 2 (not shown) to the small machine learning model n 156 to take over the processing of the video stream.

When detecting an event, when receiving of user input, when detecting a change (during a specific iteration operation period) of one or more features of the part of the dataset input to the selected small machine learning model and/or output from the selected small machine learning model (for example, such as the change in average pixel value in the previous example), accuracy metrics and/or loss functions, a combination of the above situations or in similar situations, the model selection process may be re-executed at regular intervals (for example, every n video frames, every n seconds, etc.). The model selector 136 may continuously monitor the execution of the selected small machine learning model for a given dataset to ensure that the most efficient small machine learning model is being executed.

Figure 2:
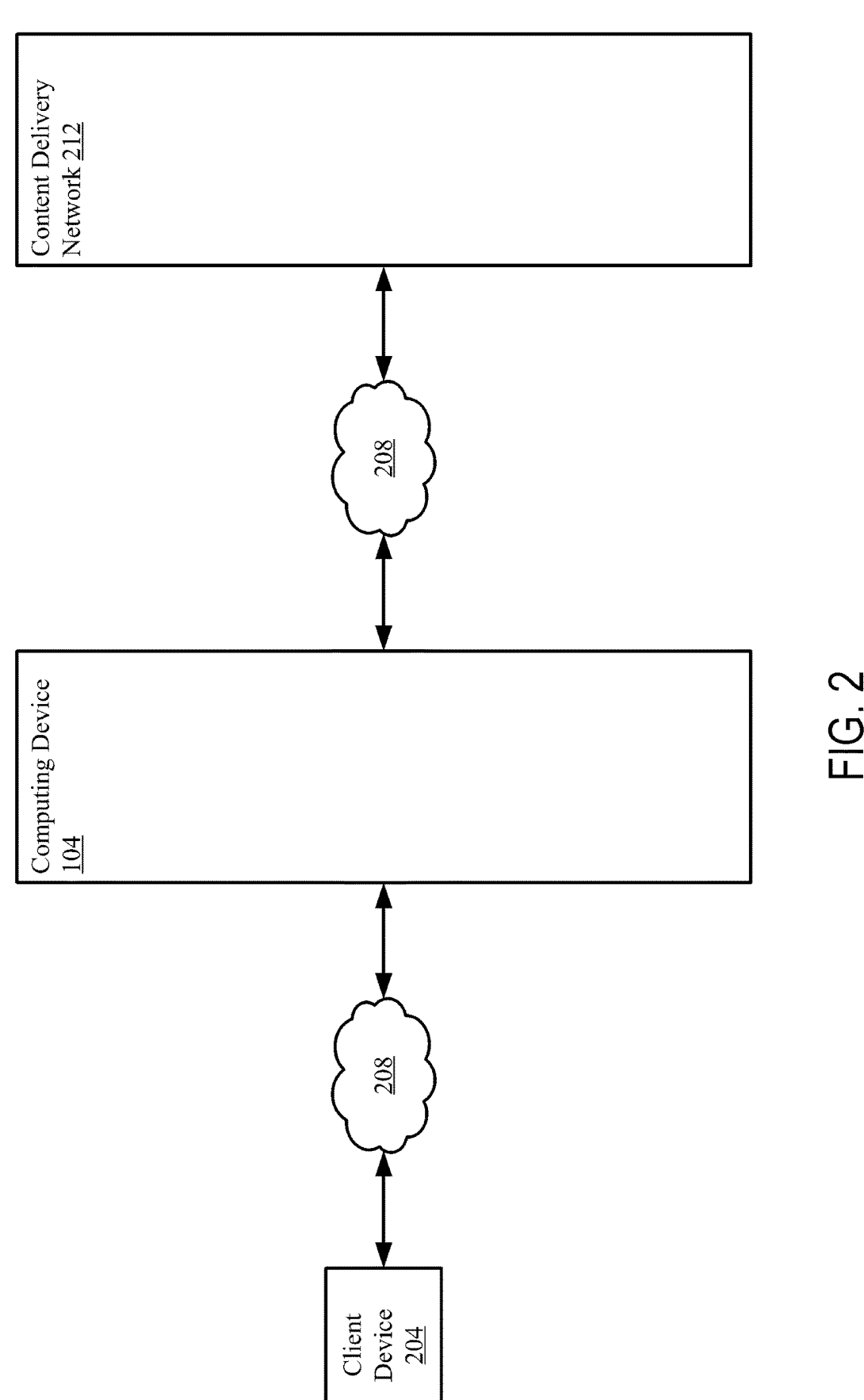
FIG. 2 illustrates an exemplary three-dimensional content representation system according to various aspects of the disclosure.

FIG. 2 illustrates an exemplary three-dimensional content representation system according to various aspects of the disclosure. In some embodiments, the computing device 104 may operate as a load balancer by providing processing services to one or a plurality of user devices (such as a user device 204). For example, the user device 204 may be any processing device, for example, but not limited to, a desktop computer or a notebook computer, a mobile device (for example, a smart phone, a tablet computer, etc.), a video game console, a server, etc. The user device 204 may execute a processing intensive application. The user device 204 may use resources of the computing device 104 by transmitting and/or streaming datasets to the computing device 104. The computing device 104 may use the data processor 124 to select a small machine learning model, and the small machine learning model is configured to process the dataset to produce an output (or output stream). The computing device 104 may transmit (or stream) the output back to the user device 204.

In other examples, the computing device 104 may process datasets that may not be locally processed by the user device 204. For example, the computing device 104 may operate on a virtual reality application configured to present three-dimensional representations of various media (for example, movies, video games, analogies, etc.). The computing device 104 may receive content associated with the virtual reality application from a content delivery network 212 through a network 208. In another example, the computing device 104 may receive images from a live camera feed (or images aggregated from the live camera feed), and if the content is not yet a three-dimensional representation, the computing device 104 uses monocular depth estimation to convert the content into a three-dimensional representation. The monocular depth estimation is a process of determining an approximate distance between a surface represented in an image (or video frame) and a camera that captures the image. In some examples, the monocular depth estimation may be performed on each pixel in the image (or video frame), so as to generate a depth map. The distance may be used to generate a three-dimensional representation of the two-dimensional image. Three-dimensional representation may be used in computer vision applications such as augmented reality, virtual reality, 3D television, video games, map 3D environments, simulations, vehicle automation (such as driverless vehicles), etc.

The computing device 104 may receive a request for three-dimensional content from the user device 204. The computing device 104 may request content from the content delivery network 212 and process the content (in real-time). In some examples, computing device 104 may transmit the content and the depth maps generated by a data processor (for example, the data processor 124) of the computing device 104 to the user device 204. The user device 204 may use the content and the depth maps to generate a three-dimensional representation of the content for the virtual reality application. Alternatively, the user device 204 may receive the content directly from the content delivery network 212 and the depth maps from the computing device 104. Each depth map may be associated with metadata indicating a position of the content corresponding to the depth map. In other examples, the computing device 104 may generate a three-dimensional representation of the content and transmit or stream the three-dimensional representation of the content to the user device 204. For example, the user device 204 may be connected to the computing device 104 and stream various three-dimensional representations of content generated by the computing device 104 from the content delivery network.

Figure 3:
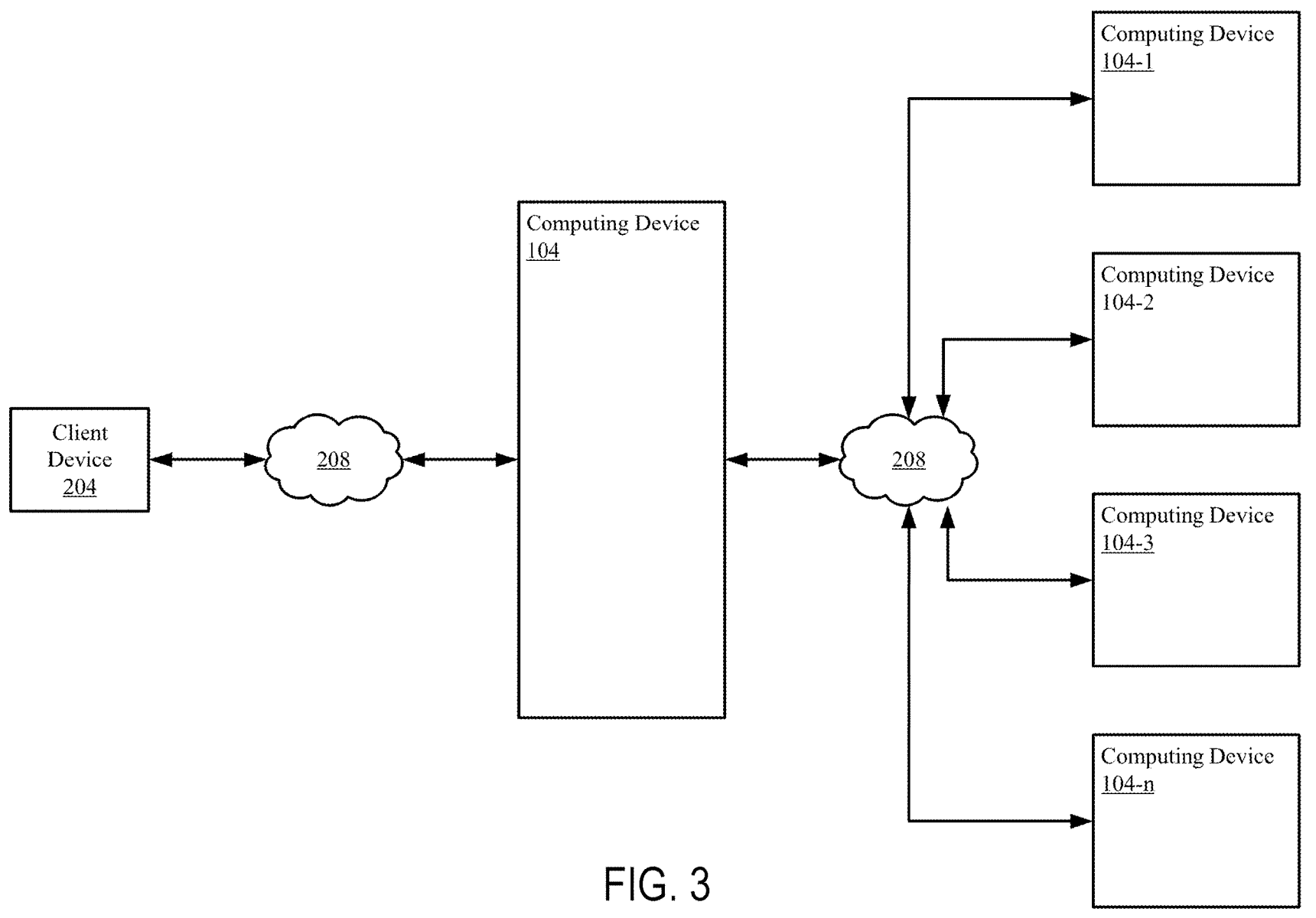

FIG. 3 is a block diagram of an exemplary distributed data processing network according to various aspects of the disclosure. The computing device 104 may operate in a distributed network, where the distributed network is configured to provide processing services to one or a plurality of devices (for example, the user device 204, other devices, servers, networks, etc.). The computing device 104 may include a data processor 124 configured to process various datasets. The data processor 124 may use a model selection process on the large machine learning model and one or more small machine learning models to determine the most efficient machine learning models to be used when processing a specific dataset. A selection process of the small models may balance or reduce a processing load of the computing device 104 and achieve overall accuracy in selecting the machine learning models to be used to process the specific dataset. In some examples, the computing device 104 may operate on multiple large machine learning models and corresponding one or more small machine learning models to achieve parallel processing of similar and/or disparate datasets.

In some examples, the computing device 104 may operate as a node in the distributed data processing network. Any number of additional computing devices (for example, a computing device 104-1, a computing device 104-2, a computing device 104-3, a computing device 104-n, etc.) may operate in the distributed data processing network. The computing devices 104 and 104-1 to 104-n may constitute a distributed data processing system, where each computing device may include a data processor (for example, the data processor 124) with a large machine learning model and one or more small machine learning models and a model selector, where the model selector is configured to identify the most efficient small machine learning models capable of processing a given dataset with a threshold accuracy and/or loss.

The computing device 104 may further include a load balancer, where the load balancer is configured to identify a specific computing device capable of processing a specific dataset. For example, the user device 204 may transmit a request with an identification of a specific dataset to be processed to the computing device 104. The load balancer may select a computing device capable of processing the specific dataset from the computing device 104 and the computing devices 104-1 to 104-n. The load balancer may select the computing device by using one or more features of the specific dataset, the computing device 104 and the computing devices 104-1 to 104-n, where the one or more features are, for example but not limited to, a processing load of each corresponding computing device, a data type of the specific dataset, an expected output, a data type capable of being processed by the corresponding computing device, a network bandwidth, a transmission path (for example, for transmitting the specific dataset to each corresponding computing device and transmitting the output back to the user device 204, etc.), the accuracy and/or loss of the machine learning model configured to process the specific dataset (as determined by using the model selection process described above), combinations thereof, or similar features. In some examples, the one or more features may be weighted, where the weights are continuously adjusted based on a state of the distributed data processing network. For example, the features corresponding to capabilities of a computing device based on the specific dataset may be given high weights to ensure that the selected computing device is capable of processing the specific dataset (for example, if the specific dataset includes image data, the small machine learning models of the selected computing device are trained to process image data, etc.). Other features may be assigned with weights to balance the processing load on the distributed data processing network.

In some embodiments, the dataset may be processed by more than one computing device. For example, a large dataset or media stream may be processed in discrete segments (for example, each image or video frame, every n-second block, every n-bit data, etc.). The computing device 104 may generate a sequence of feature vectors. Alternatively, regarding a real-time operation, when the computing device receives data, the computing device may generate feature vectors. Each feature vector may be associated with a sequence identifier, where the sequence identifier indicates a part of the dataset from which the feature vector originates. The computing device 104 may then transmit the feature vector to the computing device selected by the load balancer to process the feature vector and produce an output. The computing device 104 may receive the output from the selected computing device along with the identification and/or sequence identifier of the feature vector. The computing device 104 may then assemble the output received from the computing device processing the dataset into an output sequence (when processing non-real-time data), or transmit each output to the user device 204 when generating the output. By distributing the dataset across the computing devices of the distributed data processing network, the computing device 104 may reduce the processing load of the distributed data processing network, reduce a processing waiting time by processing a plurality of parts of the dataset in parallel, and maintain accuracy of the dataset being processed, etc.

In other examples, computing device 104 may transmit the selected small machine learning model to the user device 204, so that the user device 204 may process the dataset locally. In these examples, the data processor of the computing device 104 may use samples of the dataset to perform the model selection process to identify the specific small machine learning model (as described above) that is capable of processing the dataset with the threshold accuracy or loss. The computing device 104 may then transmit the selected small machine learning model to the user device 204. The user device 204 may use the selected small machine learning model to process the rest part of the dataset.

Figure 4:
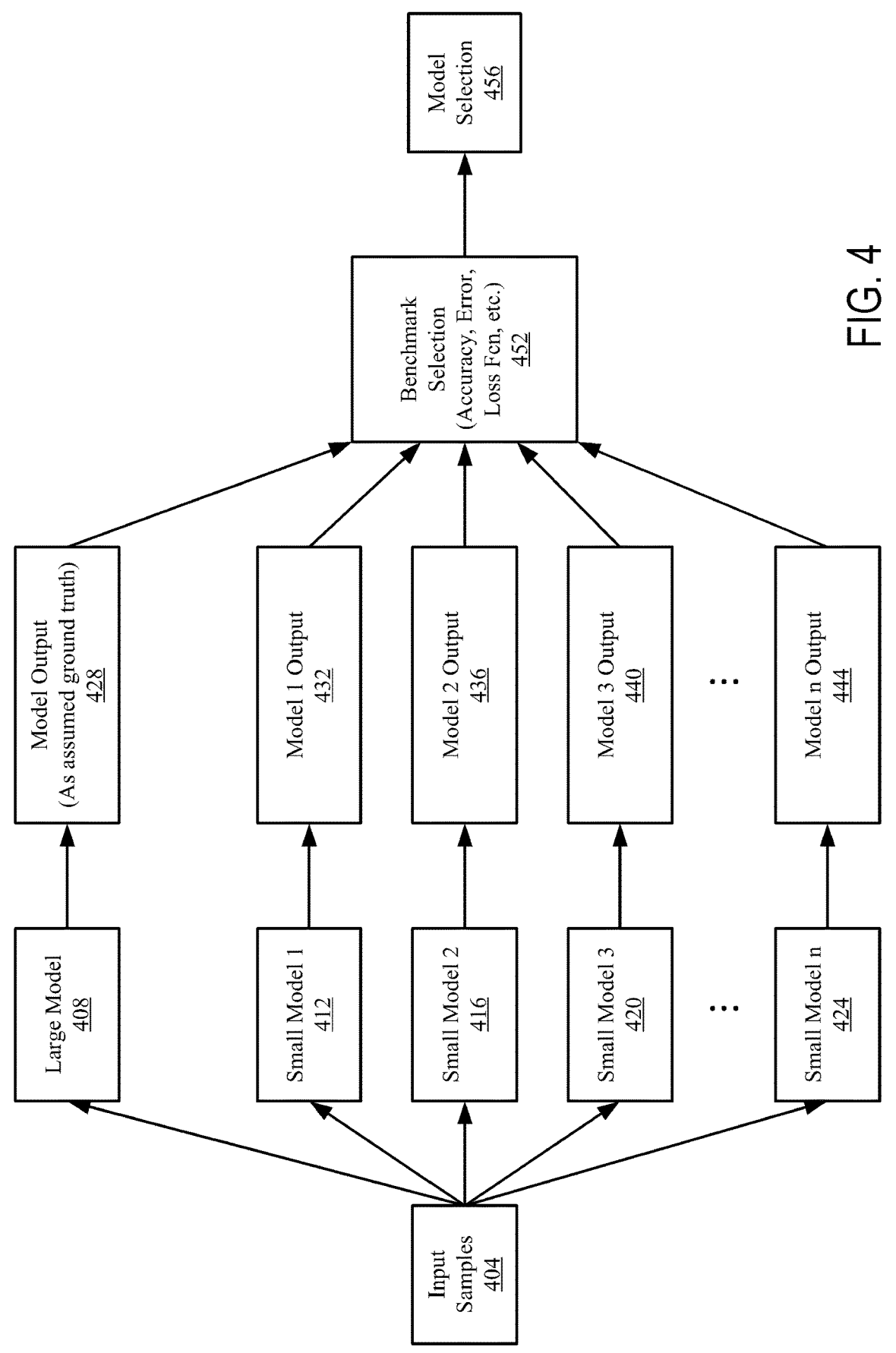
FIG. 4 is a block diagram of an exemplary model selection process for selecting a small machine learning model for processing a dataset according to various aspects of the disclosure.

FIG. 4 is a block diagram of an exemplary model selection process for selecting a small machine learning model for processing a dataset according to various aspects of the disclosure. The model selection process may identify a specific machine learning model to be used to process a given dataset. The large machine learning model 408 (for example, with a number of parameters and/or number of layers greater than a threshold) may be trained to process general datasets. The large machine learning model 408 may be compressed to produce one or a plurality of small machine learning models (for example, a small model 1 412, a small model 2 416, a small model 3 420, a small model n 424, etc.). The large machine learning models 408 may be compressed before, during, or after training. The large machine learning model 148 may be compressed through pruning (for example, removing unnecessary parameters or layers), quantization (for example, reducing a memory occupation area of parameters), knowledge distillation (for example, training the small machine learning models to simulate the large machine learning model), low-rank factorization, or any other compression algorithm. Alternatively, the one or plurality of small machine learning models may be defined and trained independently. Any number of the small machine learning models may be produced (either through compression or through independent training), where n is any integer greater than 1.

When a request for processing the specific dataset is received, the model selection process may begin. The specific dataset may be sampled to produce one or a plurality of discrete parts of the dataset that may be processed by the machine learning models 408-424. One or a plurality of feature vectors may be derived from each of the one or plurality of discrete parts of the dataset. In some embodiments, a single feature vector may be derived for the machine learning models 408-424. In other embodiments, the feature vector may be derived for each machine learning model, and the feature vector may be customized for the machine learning model (for example, based on the number of parameters and/or number of layers of the model, etc.). The one or plurality of feature vectors may be used to execute each of the machine learning models 408-424 to produce a corresponding model output. The large machine learning model 408 may process the feature vector to produce a model output 428. The small machine learning model 1 412 may process the feature vector to produce a model 1 output 432, and the small machine learning model n 424 may process the feature vector to produce a model n output 444, and so on.

At benchmark selection 452, one or a plurality of benchmarks may be selected for evaluating the model outputs 428-444. The benchmark selection 452 may specify the model output (for example, the model output 428) from the large machine learning model 408 as a ground truth, and compare the model outputs (for example, the model outputs 432-444) from the small machine learning models 412-424 with the model output 428.

In some embodiments, the benchmark selection may determine the benchmarks based on data types of the model outputs 428-444. For example, a benchmark for a classifier may be an accuracy metric or an error metric that evaluates the output according to a Boolean value (for example, true/false or correct/incorrect, etc.). A benchmark for a machine learning model that outputs a numerical output (for example, such as a depth estimation machine learning model that outputs a depth map or an inverse depth map, etc.) may be a loss function (which, for example, determines a difference between a control value and the output). When evaluating the outputs 428-444, the benchmark selection 452 may use one or more benchmarks.

In some examples, regarding the output including the depth map, the benchmark selection 452 may use a weighted human disagreement rate, a mean absolute relative error, a robust function loss, or similar functions. The weighted human disagreement rate uses an equal weight (for example, set to 1) and identifies whether each pixel of the output depth map is closer or farther away from the corresponding pixel of the ground truth model output 428. Each pixel of the model output may be represented by 0 (indicating that the pixel output by the model is closer than the corresponding pixel in the ground truth depth map) or 1 (indicating that the pixel output by the model is farther away than the corresponding pixel in the ground truth depth map). The distribution of 0 and 1 may be used to evaluate a degree to which the model output depth map deviates from the ground truth. The mean absolute relative error may use $$\frac{1}{M}\sum\nolimits_{i=0}^{M}\frac{|z_i - z_i^*|}{z_i^*}$$

to evaluate error, where $z_i$ corresponds to a value of a pixel I on the depth map being evaluated, $z_i^*$ corresponds to a basic ground truth of the pixel i of the ground true depth map 428, and M corresponds to a total number of pixels of the depth map.

The robust function loss may be represented by d, where d represents a predicted disparity (between the ground truth of a given pixel and the model output), d* represents a ground truth of the pixel from the ground truth model output, and M represents the number of pixels in the depth map.

$$L_2(d_i, d_i^*) = \frac{1}{M}\sum\nolimits_{i}^{M}\|d_i - d_i^*\|^2$$

In other examples, any accuracy metric, loss function, error rate, or similar functions may be used to evaluate the model output relative to the ground truth model output. Examples of accuracy metric and/or loss function include, but are not limited to, accuracy, precision, area under the curve, logarithmic loss, F1 score, weighted human disagreement rate, cross entropy, mean absolute relative error, mean square error, or similar functions.

The benchmark selection 452 may then identify the model outputs 432-444 that have the highest accuracy or lowest loss. The model selection 456 may then select a small machine learning model corresponding to the identified model output from the small machine learning models

412-424. The rest of the specific dataset may be processed by using the selected small machine learning model.

FIG. 5 is a flowchart of an exemplary process for model selection of monocular depth estimation according to various aspects of the disclosure. The monocular depth estimation may be implemented by one or more machine learning models (such as a deep neural network or similar models), the one or more machine learning models are used for various computer vision operations (for example, but not limited to classification, semantic segmentation, object detection, instance segmentation, depth estimation, etc.) (for example, autonomous driving for driverless vehicles, virtual reality, augmented reality, three-dimensional (3D) analogy, target acquisition, etc.). A model selection process may be performed to select an efficient machine learning model based on processing resources consumed by the selected machine learning model and the accuracy of the machine learning model in processing the specific dataset.

For example, at a block 504, the computing device may receive a plurality of images. The plurality of images may be independent images (unrelated to other images in the plurality of images), images extracted from video frames, images extracted from video clips, or similar images. The images may be received from a camera, a content delivery network, a user device, another computing device, a server, etc. Alternatively, the computing device may receive the images by retrieving the images from video clips stored in a memory of the computing device or from a live camera stream. Regarding the live camera streaming, the images may be received continuously as they are captured by the camera. Since additional images of the live camera stream will be received along with elapse of time, once a first image from the live camera stream is received, the computing device is considered to have received the plurality of images.

At a block 508, the computing device may select one or more images from the plurality of images. For example, the computing device may sample the plurality of images to obtain the one or more images. Regarding the live camera stream, the one or more images may correspond to the one or more images received from the live camera stream. In some embodiments, the computing device may randomly sample the plurality of images. In other embodiments, the computing device may select the one or more images from the plurality of images based on one or a plurality of parameters. The one or plurality of parameters may be based on a number and/or order of images in the plurality of images, features of the images (for example, pixel values (for example, an average of a red value, a green value, blue value, and/or a pixel brightness) etc.)), metadata associated with the plurality of images, combinations thereof or similar data. For example, the computing device may sample the plurality of images by evenly selecting images (for example, the first image and the last image when sampling two images from the plurality of images) based on that the number of images included in the sampling is over the distribution of the plurality of images.

At a block 512, the computing device may process the one or more images by using a first machine learning model to generate a first prediction result. For example, the computing device may generate a feature vector by using the one or more images. The feature vector may be taken as an input for transmitting to the first machine learning model. The first machine learning model may process the feature vector and output the first prediction result. The first machine learning model may be a large machine learning model. Tre large machine learning model may be a machine learning model with a number of parameters and/or layers greater than a threshold. In some examples, the computing device may label the first prediction result as a pseudo ground truth that may be used to compare the outputs of other machine learning models with the first prediction result.

At a block 516, the computing device may process the one or more images by using a plurality of machine learning models to generate a second prediction result (for example, using the first machine learning model in the plurality of machine learning models), a third prediction result (for example, using a second machine learning model in the plurality of machine learning models), etc. The plurality of machine learning models may be small machine learning models. The small machine learning models may include a number of parameters and/or layers that are less than a threshold. The first machine learning model may include more parameters and/or layers than that of the plurality of machine learning models. The plurality of machine learning models may be generated by compressing the first machine learning model (for example, using pruning, quantization, knowledge distillation, low-rank factorization, etc.) before, during, or after training the first machine learning model. In some examples, the computing device determines whether to train the plurality of machine learning models. The computing device may determine to use the same training data as used to train the first machine learning model, training data similar to that used to train the first machine learning model, or training data different from that used to train the first machine learning model to train one of or a plurality of the machine learning models. Alternatively, the plurality of machine learning models may be defined and trained independently (for example, separately from the first machine learning model). In these embodiments, the plurality of machine learning models may be of the same, similar, or different types as the first machine learning model (for example, different models, different parameters, different types of layers, different algorithms, different training process or iteration operations, etc.).

The computing device may input the plurality of machine learning models by using the same or similar feature vectors (derived from the one or more images) that are transmitted as the input to the first machine learning model to generate the second prediction result, the third prediction result, etc. In other embodiments, the computing device may customize feature vectors for the plurality of machine learning models. Since the plurality of machine learning models have fewer parameters and/or layers, the machine learning models may accept fewer features in the input feature vectors. The computing device may compress the feature vectors (for example, using any of the aforementioned compression techniques) to reduce the number of the input features.

At a block 520, the computing device may select a second machine learning model from the plurality of machine learning models based on a comparison of the first prediction result with the second prediction result and the third prediction result. In some embodiments, the computing device may compare the second prediction result, the third prediction result, etc., with the first prediction result using one or a plurality of accuracy metrics and/or loss functions. For example, a depth map may represent each pixel of an image as a distance (for example, a real number) between a location of the pixel in the environment and the camera. The computing device may perform a pixel-by-pixel comparison on each distance of each pixel of the second prediction result relative to each corresponding pixel in the first prediction result (for example, regarded as a ground truth for comparison purposes). A loss function may be used to determine comparisons of the second prediction result to the first prediction result, and the third prediction result to the first prediction result, etc. Examples of the loss function include, but are not limited to, adaptive robust loss, mean square error, mean absolute error, cross entropy, weighted human disagreement rate (WHDR), combinations thereof, or similar functions. The computing device may select the machine learning model with the highest accuracy metric, lowest error rate, lowest loss, etc., from the plurality of machine learning models to process the plurality of images.

At a block 524, the computing device may process the plurality of images using the second machine learning model (for example, the machine learning model with the highest accuracy or lowest loss selected from the block 520). In some examples, the computing device may process each of the plurality of images. In other examples, the computing device may sample the plurality of images (for example, every $n^{th}$ image, etc.) to process a part of the plurality of images. Returning to the example of monocular depth estimation, the computing device may use the second machine learning model and the plurality of images generating the sequence of the depth maps. Since the second machine learning model is a small machine learning model, the monocular depth estimation may be performed near real-time (for example, using live camera streams, dynamic images from video games, or images generated according to programs, etc.).

In some examples, the model selection process may be repeated to ensure that the second machine learning model remains the most efficient machine learning model for processing the plurality of images. When an event is detected, when a user input is detected, after execution of a predetermined number of iteration operations of the second machine learning model, when changes in one or a plurality of features of the plurality of images are detected (such as a change in an average pixel value, etc.), in a combination of the above situations, or in similar situations, the model selection process may be re-executed at regular time intervals. The computing device may continuously ensure that the plurality of images are processed by using the most efficient machine learning model (for example, a machine learning model that has the highest accuracy, lowest error rate, lowest loss, etc. when processing the plurality of images).

The model selection process may be applied to various machine learning models to determine efficient ways of processing disparate data sets. In this way, the techniques explained in this specification may be applied to deep neural networks (as explained previously) as well as any other type of machine learning model or dataset.

Figure 6:
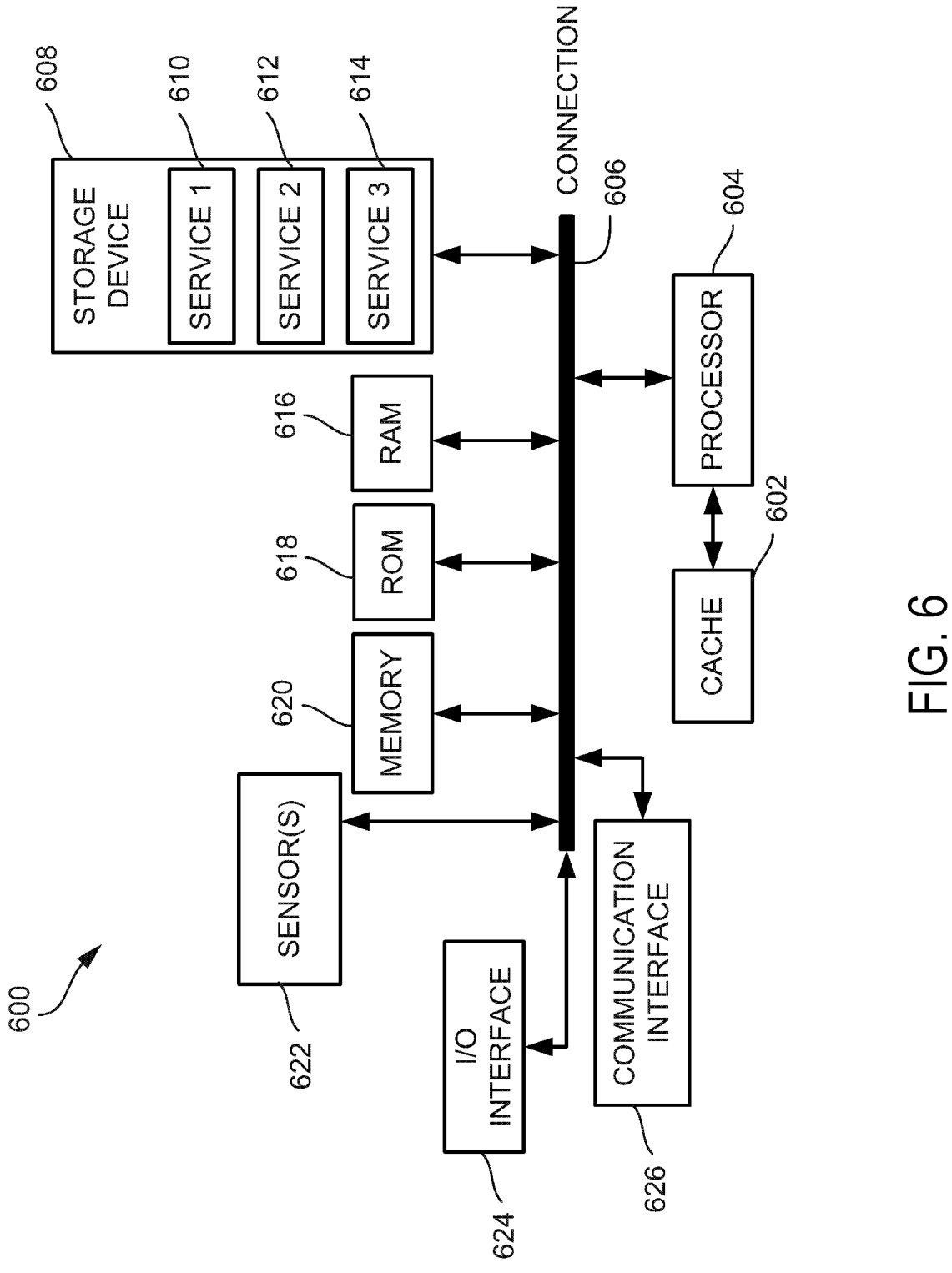
FIG. 6 illustrates an exemplary computing device structure adapted to implement various techniques described in the specification according to various aspects of the disclosure.

FIG. 6 illustrates an exemplary computing device according to various aspects of the disclosure. For example, a computing device 600 may implement any of the system or method set forth herein. In some embodiments, the computing device 600 may be a component of or included within a media device. The components of the computing device 600 are shown in electrical communication with each other by using a connection member 606 such as a bus, etc. The exemplary computing device 600 includes a processor (for example, a CPU, a processor, or a similar device) 604 and the connection member 606 (for example, a bus or similar device), where the connection member is configured to connect the components of the computing device 600 (for example, but not limited to, a memory 620, a read only memory (ROM) 618, a random access memory (RAM) 616 and/or a storage device 608) to the processor 604.

The computing device 600 may include a cache 602 of a high-speed memory, where the high-speed memory is directly connected to the processor 604, closely adjacent to the processor 604, or integrated within the processor 604. The computing device 600 may copy data from the memory 620 and/or the storage device 608 to the cache 602 for faster access by the processor 604. In this way, the cache 602 may provide a performance boost (boost), which avoids latency when the processor 604 waits for data. Alternatively, the processor 604 may access data directly from the memory 620, the ROM 618, the RAM 616, and/or the storage device 608. The memory 620 may include various types of homogeneous memory or heterogeneous memory (for example, but not limited to, magnetic memory, optical memory, solid state memory, etc.).

The storage device 608 may include one or a plurality of non-transitory computer-readable media, such as volatile memory and/or non-volatile memory. The non-transitory computer-readable media may store instructions and/or data that may be accessed by the computing device 600. The non-transitory computer-readable media may include, but not limited to, magnetic cassettes, hard-disk drives (HDD), flash memories, solid-state memory devices, digital versatile disks, cartridges, optical discs, the random access memory (RAM) 616, the read only memory (ROM) 618, combinations thereof, or similar devices.

The storage device 608 may store one or a plurality of services (for example, a service 1 610, a service 2 612, and a service 3 614) that may be executed by the processor 604 and/or other electronic hardware. The one or plurality of services include instructions that may be executed by processor 604 to perform: implement operations, such as any of the techniques, steps, processes, blocks, and/or operations set forth herein; operations of devices controlling communication with the computing device 600; operation of the processor 604 and/or any specified processor; a combination thereof; or similar devices. The processor 604 may be a system on a chip (SOC). The SOC includes one or a plurality of kernels or processors, bus, memory, clock, memory controller, cache, and other processor components. and/or similar devices. Multi-kernel processor may be symmetric or asymmetric.

The computing device 600 may include one or a plurality of input devices 622, the one or plurality of input devices 622 may represent any number of input mechanisms, such as a microphone, a touch screen for graphical input, a keyboard, a mouse, motion input, voice input, a media device, a sensor, combinations thereof, or similar devices. The computing device 600 may include one or a plurality of output devices 624 that output data to a user. Such output device 624 may include, but not limited to, a media device, a projector, a television, a speaker, combinations thereof, or similar devices. In some embodiments, a multimodal computing device may enable the user to provide multiple types of inputs to communicate with the computing device 600. A communication interface 626 may be configured to manage the input of the user and the output of the computing device. The communication interface 626 may also be configured to manage communications with remote devices (for example, to establish connections, receive/transmit data, etc.) through one or a plurality of communication protocols and/or through one or a plurality of communication media (for example, wired, wireless, etc.).

The computing device 600 is not limited to the components as shown in FIG. 6. The computing device 600 may include other components that are not shown and/or the shown components may be omitted.

The following examples illustrate various aspects of the disclosure. As used below, any reference to a series of examples will be understood as a separate reference to each of these examples (for example, "example 1 to example 4" shall be understood as "example 1, example 2, example 3 or example 4").

The example 1 is a computer-implemented method, and the computer-implemented method includes: receiving a plurality of images; selecting one or more images from the plurality of images; using a first machine learning model to process the one or more images to produce a first prediction result; using a plurality of machine learning models to process the one or more images to generate at least a second prediction result and a third prediction result, where the first machine learning model is larger than the plurality of machine learning models; selecting a second machine learning model from the plurality of machine learning models based on comparison of the first prediction result with the at least second prediction result and the third prediction result; and using the second machine learning model to process the plurality of images.

The example 2 is the computer-implemented method of any of the example 1 and the example 3 to the example 8, where the method of selecting the second machine learning model from the plurality of machine learning models includes: generating a first accuracy value for the first prediction result, a second accuracy value for the second prediction result, and a third accuracy value for the third prediction result; and comparing the first accuracy value, the second accuracy value, and the third accuracy value, where the second machine learning model is selected based on the second accuracy value being higher than the first accuracy value and the third accuracy value.

The example 3 is the computer-implemented method of any of the example 1 to the example 2 and the example 4 to the example 8, where the method of selecting the second machine learning model includes: generating a first value of the first prediction result, a second value of the second prediction result, and a third value of the third prediction result using the loss function; and comparing the first value, the second value, and the third value, where the second machine learning model is selected based on the second value being higher than the first value and the third value.

The example 4 is the computer-implemented method of any of the example 1 to the example 3 and the example 5 to the example 8, where the second machine learning model is configured to generate a depth estimation map for images of the plurality of images.

The example 5 is the computer-implemented method of any of the example 1 to the example 4 and the example 6 to the example 8, where the second machine learning model is configured to perform semantic segmentation on images of the plurality of images.

The example 6 is the computer-implemented method of any of the example 1 to the example 5 and the example 7 to the example 8, where the second machine learning model is configured to perform instance segmentation by using images of the plurality of images.

The example 7 is the computer-implemented method of any of the example 1 to the example 6 and the example 8, where the plurality of machine learning models are deep neural networks.

The example 8 is the computer-implemented method of any of the example 1 to the example 7, where the first machine learning model includes more layers than each of the plurality of machine learning models.

An example 9 is a system that includes: one or a plurality of processors; a non-transitory computer-readable medium storing instructions, where when the instructions are executed by the one or plurality of processors, the processors perform the operations described in any of the example 1 to the example 8.

executed by the one or plurality of processors, the processors perform the operations described in any of the example 1 to the example 8.

An example 10 is a non-transitory computer-readable medium, the non-transitory computer-readable medium stores instructions, where when the instructions are executed by the one or plurality of processors, the processors perform the operations described in any of the example 1 to the example 8.

The term "computer-readable medium" includes, but is not limited to, portable storage device or non-portable storage device, optical storage device, and various other media capable of storing, containing or carrying instructions and/or data. The computer-readable medium may include a non-transitory medium, and in the non-transitory medium, data may be stored in a form that does not include carrier waves and/or electronic signals. Examples of the non-transitory medium may include, but are not limited to, magnetic disks or tapes, optical storage media (such as compact disks (CDs) or digital versatile discs (DVDs)), flash memories, memories or memory devices. The computer-readable medium may store codes and/or machine-executable instructions, and the machine-executable instructions may represent procedures, functions, subprograms, programs, routines, subroutines, modules, software packages, classes, or any combination of instructions, data structures, or program statements. A code segment may be coupled to another code segment or hardware circuit by transmitting and/or receiving information, data, arguments, parameters, or memory content. The information, arguments, parameters, data, etc., may be transferred, forwarded or transmitted by any suitable means (including memory sharing, message transmitting, token passing, network transmission or similar means).

Some parts of this specification illustrate examples based on algorithms and symbolic representation of operations performed on information. These operations (although set forth functionally, computationally, or logically) may be implemented by computer programs or equivalent circuits, microcode, etc. In addition, the arrangement of the operations may be generally referred to as modules. The described operations and associated modules thereof may be implemented through software, firmware, hardware, or any combination thereof.

Any of the steps, operations, or processes described herein may be independently performed or implemented by using one or more hardware or software modules, or performed or implemented in combination with other devices. In some examples, the software modules may be implemented by using a computer-readable medium storing computer program codes, and the computer program codes may be executed by a processor to perform any or all of the illustrated steps, operations, or processes.

Some examples may involve devices or systems for performing any or all of the illustrated steps, operations, or processes. The devices or systems may be specially constructed for the required purposes, and/or the devices or systems may include general computing devices, the general computing devices are selectively enabled or reconfigured by a computer program stored in the memory of the computing device. The memory may be or include non-transitory tangible computer-readable storage medium, or any type of medium suitable for storing electronic instructions (which may be coupled to a bus). Furthermore, any computing system mentioned in the specification may include a single processor or multiple processors.

Although the present subject has been described in detail with respect to specific examples, it should be understood that alterations, modifications, and equivalents of such embodiments may be easily generated by those skilled in the art based on understanding of the aforementioned content. Many specific details are stated in this specification to provide a thorough understanding of the subject being advocated. However, those skilled in the art should understand that the subject being advocated may be practiced without these specific details. In other embodiments, methods, devices, or systems that are known to those with ordinary skill in the art have not been described in detail so as to avoid obscuring the subject being advocated. Therefore, the disclosure has been presented for the purpose of illustration rather than limitation, and is not intended to exclude the inclusion of such modifications, variations, and/or additions to the subject, which would be apparent to those of ordinary skills in the art.

For the sake of clarity of explanation, in some examples, the disclosure may be presented as including separate functional blocks, and these functional blocks include devices, device components, steps or routines in methods implemented by software, or functional block that is a combination of hardware and software. Additional functional blocks other than those shown in the figures and/or described herein may also be used. For example, circuits, systems, networks, processes, and other components may be shown as components in a block diagram form in order to avoid obscuring the embodiments with unnecessary details. In other embodiments, in order to avoid obscuring the embodiments, well-known circuits, processes, algorithms, structures, and techniques may be shown without unnecessary details.

Various examples may be described herein as processes or methods, which may be illustrated as charts, flowcharts, data flowcharts, structural diagrams, or block diagrams. Although a flowchart may illustrate an operation as a sequential process, many of the operations within the operation may be performed in parallel or simultaneously. Additionally, the order of the operations may be rearranged. When the operation of a process is completed, the process is terminated, but there may be additional steps that are not shown. The process may correspond to a method, a function, a procedure, a subroutine, a subprogram, etc. When the process corresponds to a function, its termination may correspond to returning of the function to a calling function or to a main function.

The processes and methods according to the above examples may be implemented by using computer-executable instructions stored in or obtained from a computer-readable medium. Such instructions may include, for example, instruction and data, and the instruction and data may cause or otherwise configure a general-purpose computer, a special-purpose computer, or a processing device to perform a specific function or a group of functions. A part of the used computer resources may be accessed through a network. The computer-executable instructions may be, for example, binary, intermediate format instructions, such as an assembly language, firmware, a source code, etc.

Devices that implement the methods and systems described herein may include hardware, software, firmware, intermediary software, microcode, hardware description languages, or any combination thereof, and may adopt any of a variety of form factors. When implementing in software, firmware, intermediary software, or microcode, the program codes or code fragments used to perform necessary tasks (for example, a computer program product) may be stored in a computer-readable or machine-readable medium. The program code may be executed by a processor, and the processor may include one or a plurality of processors, such as but not limited to one or a plurality of digital signal processors (DSPs), general-purpose microprocessors, application-specific integrated circuits (ASICs), field programmable gate arrays (FPGAs) or other equivalent integrated or discrete logic circuit systems. Such processor may be configured to perform any of the techniques set forth in the disclosure. The processor may be a microprocessor, a conventional processor, a controller, a microcontroller, a state machine or a similar device. The processor may also be implemented as a combination of computing elements (for example, a combination of a DSP and a microprocessor, multiple microprocessors, one or more microprocessors combined with a DSP kernel, or any other such configuration). Therefore, the term "processor" as used herein may refer to any of the foregoing structures, any combination of the foregoing structures, or any other structure or device suitable for implementing the techniques set forth herein. The functionality described in the specification may also be implemented in peripheral devices or add-in cards. As a further example, such function may also be implemented in different chips or processes executed in a single device on a circuit board.

In the foregoing description, various aspects of the disclosure are explained with reference to specific examples of the disclosure, but those skilled in the art may realize that the disclosure is not limited thereto. Therefore, although illustrative examples of the disclosure have been set forth in detail herein, it is to be understood that the inventive concepts may be practiced and employed in various ways and that the appended claims are intended to be construed to include such variations. The various features and aspects disclosed above may be used individually or in any combination. Moreover, the examples may be used in any number of environments and applications other than those set forth herein without departing from the broader spirit and scope of the disclosure. Accordingly, the disclosure and drawings should be regarded as illustrative and not restrictive.

The various illustrative logical blocks, modules, circuits, and algorithm steps described in the embodiments of the disclosure may be implemented as electronic hardware, computer software, firmware, or combinations thereof. To clearly illustrate this interchangeability of hardware and software, various illustrative components, blocks, modules, circuits, and steps have been described above according to functionalities of the components, blocks, modules, circuits, and steps. Whether each functionality is implemented as hardware or software depends on the specific application and design constraints on the overall system. Skilled technicians may implement the described functionality in various ways for each specific application, but such implementation details should not be interpreted as causing a deviation from the scope of this application.

Unless otherwise specifically stated, it should be understood that throughout this specification, discussions using terms such as "processing," "computing," "operating," "determining," "identifying," or similar terms refer to an operation or a process of a computing device (for example, one or a plurality of computers or similar one or a plurality of electronic computing devices) that manipulates or transforms data represented as: physical electrons or magnetic quantities within a memory, a register, or other information storage devices, transmission devices, or media devices of a computing platform. As used herein, "suitable for" or "configured to" is intended to be open-ended and inclusive language without excluding devices suitable for or configured to perform additional tasks or steps. In addition, the use of "based on" is meant to be open-ended and inclusive, as the term "based on", or a process, step, calculation, or other actions of one or more referenced conditions or values may actually be based on additional conditions or values beyond those referenced conditions or values. The titles, lists, and numbers included herein are for the ease of explanation only and do not imply any restrictions.

The aforementioned detailed description of the technology has been presented for the purposes of illustration and description. It is not intended to be exhaustive or to limit the technology to the precise forms disclosed. Many modifications and variations may be made based on the above instructions. The selection of the described embodiments is to best illustrate the principles and practical applications of the technology, and to enable other technical personnel in the art to utilize the technology in various embodiments with various modifications suitable for the specific intended use. The scope of the technology is limited by following claims.

What is claimed is:

1. A distributed data processing system, comprising:
a host computing device and at least one additional computing device having a processor, respectively executing a first machine learning model and at least one of a plurality of machine learning models, wherein the first machine learning model is larger than the plurality of machine learning models, wherein
the host computing device comprises:
a data processor, configured to process a received dataset, and comprising:
a load balancer, configured to:
select a first set of at least one computing device capable of executing the first machine learning model on the received dataset from the host computing device and the additional computing device to process samples of the dataset and generate a first prediction result by executing the first machine learning model; and
select a second set of at least one computing device capable of executing each of the plurality of machine learning models on the received dataset from the host computing device and the additional computing device to process the samples of the dataset and generate at least a second prediction result and a third prediction result by executing the plurality of machine learning models; and
a mode selector, configured to select a second machine learning model from the plurality of machine learning models based on a comparison of the first prediction result and the at least second prediction result and the third prediction result, wherein for the comparison, the first prediction result generated from the first machine-learning model for the samples of the dataset is utilized as a ground truth to evaluate the at least the second prediction result and the third prediction result generated for the same samples of the dataset, and
the data processor is configured to instruct at least one of the second set of at least one computing device that is selected for executing the second machine learning model to process a rest part of the dataset by executing the second machine learning model.

2. The distributed data processing system as claimed in claim 1, wherein the load balancer comprises using the dataset and one or a plurality of features of the host computing device and the additional computing device to select the computing device for processing the received dataset.

3. The distributed data processing system as claimed in claim 2, wherein the one or plurality of features comprise a data type and an expected output of the dataset, a processing load of each of the computing devices in the host computing device and the additional computing device, a processable data type, a network bandwidth, a transmission path, accuracy or loss of the machine learning model configured to process the dataset, or a combination of the above features.

4. The distributed data processing system as claimed in claim 2, wherein the load balancer further weights the one or plurality of features to select the at least one computing device for processing the received dataset, and continuously adjusts a weight of each of the one or plurality of features based on a state of the distributed data processing system.

5. The distributed data processing system as claimed in claim 1, wherein the load balancer further divides the dataset into a plurality of segments discrete to each other to generate a sequence of a plurality of feature vectors, and transmits each of the feature vectors and an associated sequence identifier thereof to the selected at least one computing device for processing the feature vector and producing an output, wherein the sequence identifier of each of the feature vectors indicates a part of the dataset from which the feature vector originates.

6. The distributed data processing system as claimed in claim 5, wherein the load balancer further receives the output and the sequence identifier from the selected at least one computing device, and assembles the output into an output sequence according to the sequence identifier.

7. The distributed data processing system as claimed in claim 5, wherein the segment comprises every image or video frame, every n-second block, or every n-bit data, wherein n is a positive integer.

8. The distributed data processing system as claimed in claim 1, wherein the the mode selector comprises:
generating a first accuracy value of the first prediction result, a second accuracy value of the second prediction result, and a third accuracy value of the third prediction result; and
comparing the first accuracy value, the second accuracy value, and the third accuracy value, wherein the second machine learning model is selected based on the second accuracy value being higher than the first accuracy value and the third accuracy value.

9. The distributed data processing system as claimed in claim 1, wherein the mode selector comprises:
generating a first value of the first prediction result, a second value of the second prediction result, and a third value of the third prediction result using a loss function; and
comparing the first value, the second value, and the third value, wherein the second machine learning model is selected based on the second value being higher than the first value and the third value.

10. The distributed data processing system as claimed in claim 1, wherein the first machine learning model comprises more layers than each of the plurality of machine learning models.

11. A distributed data processing method, adapted to a distributed data processing system comprising a host computing device having a data processor and at least one additional computing device having a processor, the distributed data processing method comprising:
receiving a dataset to be processed by the host computing device;
selecting a first set of at least one computing device capable of executing a first machine learning model on the received dataset from the host computing device and the additional computing device by the host computing device to process samples of the dataset and generate a first prediction result by executing the first machine learning model;

selecting a second set of at least one computing device capable of executing each of a plurality of machine learning models on the received dataset from the host computing device and the additional computing device by the host computing device to process the samples of the dataset and generate at least a second prediction result and a third prediction result by executing the plurality of machine learning models;

selecting a second machine learning model from the plurality of machine learning models by the host computing device based on a comparison between the first prediction result and the at least second prediction result and the third prediction result, wherein for the comparison, the first prediction result generated from the first machine-learning model for the samples of the dataset is utilized as a ground truth to evaluate the at least the second prediction result and the third prediction result generated for the same samples of the dataset; and instructing at least one of the second set of at least one computing device that is selected for executing the second machine learning model by the host computing device to process a rest part of the dataset by executing the second machine learning model.

12. The distributed data processing method as claimed in claim 11, wherein the host computing device comprises using the dataset and one or a plurality of features of the host computing device and the additional computing device to select the computing device for processing the received dataset.

13. The distributed data processing method as claimed in claim 12, wherein the one or plurality of features comprise a data type and an expected output of the dataset, a processing load of each of the computing devices in the host computing device and the additional computing device, a processible data type, a network bandwidth, a transmission path, accuracy or loss of the machine learning model configured to process the dataset, or a combination of the above features.

14. The distributed data processing method as claimed in claim 12, wherein the host computing device further weights one or a plurality of features to select the at least one computing device for processing the received dataset, and continuously adjusts a weight of each of the one or plurality of features based on a state of the distributed data processing system.

15. The distributed data processing method as claimed in claim 11, wherein the host computing device further divides the dataset into a plurality of segments discrete to each other to generate a sequence of a plurality feature vectors, and transmits each of the feature vectors and an associated sequence identifier thereof to the selected at least one computing device for processing the feature vector and producing an output, wherein the sequence identifier of each of the feature vectors indicates a part of the dataset from which the feature vector originates.

16. The distributed data processing method as claimed in claim 15, wherein the host computing device further receives the output and the sequence identifier from the selected at least one computing device, and assembles the output into an output sequence according to the sequence identifier.

17. The distributed data processing method as claimed in claim 15, wherein the segment comprises every image or video frame, every n-second block, or every n-bit data, wherein n is a positive integer.

18. The distributed data processing method as claimed in claim 11, wherein the host computing device comprises:

generating a first accuracy value of the first prediction result, a second accuracy value of the second prediction result, and a third accuracy value of the third prediction result; and comparing the first accuracy value, the second accuracy value, and the third accuracy value, wherein the second machine learning model is selected based on the second accuracy value being higher than the first accuracy value and the third accuracy value.

19. The distributed data processing method as claimed in claim 11, wherein the host computing device comprises:

generating a first value of the first prediction result, a second value of the second prediction result, and a third value of the third prediction result using a loss function; and comparing the first value, the second value, and the third value, wherein the second machine learning model is selected based on the second value being higher than the first value and the third value.

20. The distributed data processing method as claimed in claim 11, wherein the first machine learning model comprises more layers than each of the plurality of machine learning models.

* * * * *